United States Patent

Kjerrumgaard

[11] Patent Number: 6,034,328
[45] Date of Patent: Mar. 7, 2000

[54] FITTING FOR ELECTRICAL CORD

[76] Inventor: Vibeke Kjerrumgaard, Dronninggaards Allé 106, Holte DK-2840, Denmark

[21] Appl. No.: 08/881,867

[22] Filed: Jun. 24, 1997

Related U.S. Application Data

[63] Continuation of application No. PCT/DK94/00492, Dec. 29, 1994, abandoned.

[51] Int. Cl.[7] .................................................. H02G 15/02
[52] U.S. Cl. ........................................ 174/74 R; 174/79
[58] Field of Search ................................ 174/112, 74 R, 174/79, 135, 136

[56] References Cited

U.S. PATENT DOCUMENTS

| | | | |
|---|---|---|---|
| 1,517,846 | 12/1924 | Lewis | 174/136 |
| 3,926,141 | 12/1975 | Taylor | 174/74 R |
| 4,422,478 | 12/1983 | Pentney et al. | 138/168 |
| 4,453,353 | 6/1984 | Killop et al. | 52/147 |
| 4,808,774 | 2/1989 | Crane | 174/135 |
| 5,029,704 | 7/1991 | Stillinger | 206/329 |
| 5,153,383 | 10/1992 | Whited et al. | 174/135 |

OTHER PUBLICATIONS

Catalog Sheet from Japanese "Construction" magazine, Fig 1 p. 639, together with English translation thereof, Jan. 1971.

*Primary Examiner*—Dean A. Reichard
*Assistant Examiner*—William H Mayo, III
*Attorney, Agent, or Firm*—Thomas R. Vigil

[57] ABSTRACT

A fitting (70) for covering the fixation point of a cord (80) to a ceiling surface has a hollow body (71) which defines an outer curved plane and an inner cord passage cavity (72). To facilitate a fitting or fixation of the fitting (70) after the suspension and connection of an electrical appliance such as a swinging lamp, and to facilitate a subsequent dismantling of the fitting (70) for the purpose of cleaning and/or replacement, the hollow body (71) has two parts (82, 84) which are interconnected through a hinge (86) and thus rotatable with respect to each other between a first position, in which the body (71) is opened so that the cord (80) can be introduced freely into the inner cord passage cavity (72), and a second position, in which the body (71) is closed and encircles the cord (80), the cord being received in the inner cord passage cavity. The fitting (70) preferably has locks (90, 92, 94 and 96) for locking the two parts (82 and 84) in said second position, i.e. in the position in which they encircle the cord.

21 Claims, 2 Drawing Sheets

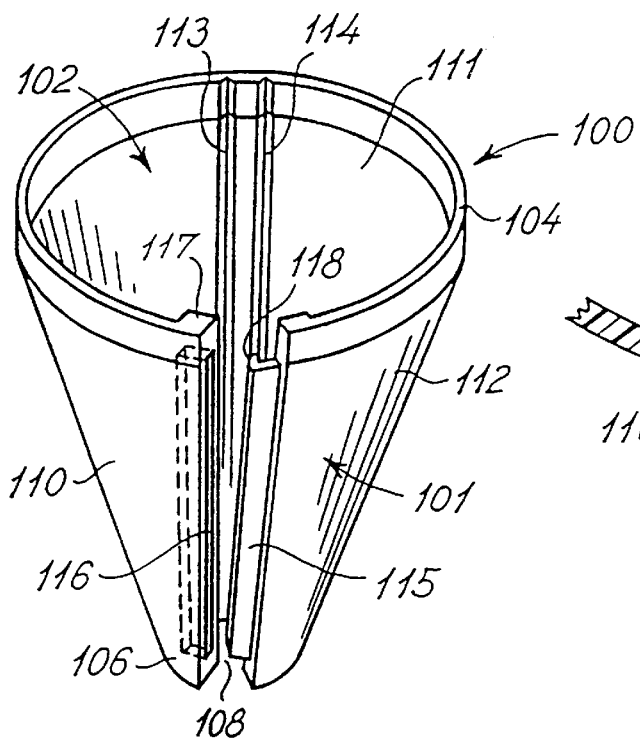
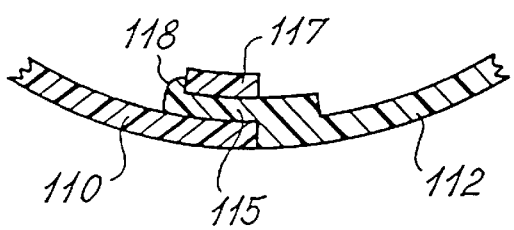
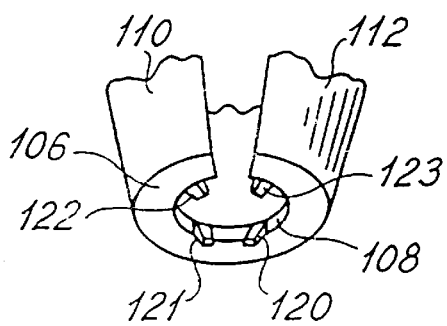
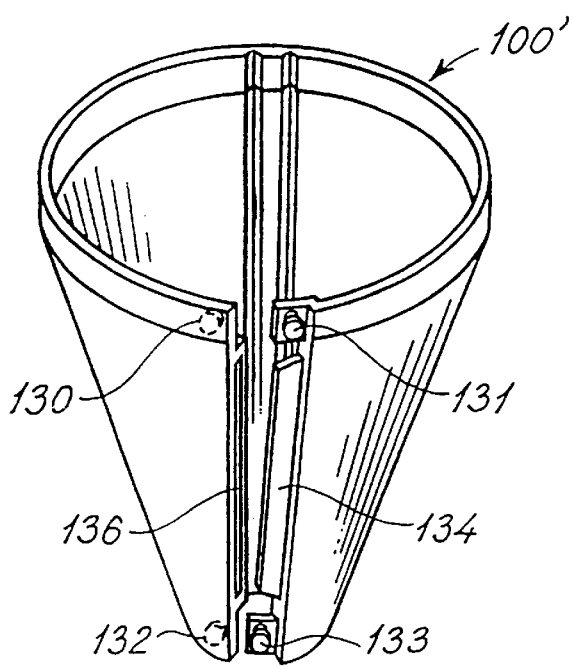
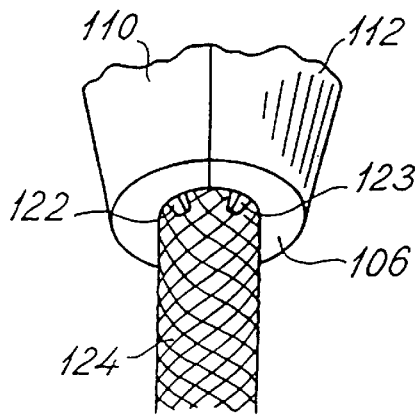

FITTING FOR ELECTRICAL CORD

CROSS REFERENCE TO RELATED APPLICATIONS

This is a continuation of International Application PCT/DK 94/00492 with an international filing date of Dec. 29, 1994, now abandoned.

BACKGROUND OF THE INVENTION

1. Field of the Invention

The present invention relates to a fitting for covering the fixation point of an electrical wire or the like to a ceiling surface.

2. Description of the Related Art Including Information disclosed under 37 CFR § 1.97–1.99.

A number of electrical appliances are suspended from a ceiling. As examples of such electrical appliances can be mentioned lamps, such as swinging lamps and spot lamps, information or display devices, such as displays or television monitors, fan blowers (ventilators) and loudspeakers. In particular, in connection with swinging lamps which are suspended in an electrical wire which is fixed to a ceiling surface, it is customary to use a fitting having a hollow body which defines an outer, curved plane and an inner cord passage cavity. The fitting is intended and adapted for mounting on a wire, at the end of which the relevant electrical appliance is suspended, e.g. the wire leading to a swinging lamp. The fitting should be mounted on the cord before fixation and before connecting e.g. the mentioned swinging lamp, and it is not possible to retrofit the fitting, i.e. to fixate the fitting, after the swinging lamp has been suspended and connected, which is often desirable for obtaining an aesthetically acceptable suspension of a swinging lamp and an advantageous and secure suspension thereof. The prior art fitting is adapted for fixation onto the above-mentioned cord by friction against the cord and may serve the purpose of covering a cord passage through a ceiling surface, a connecting box, whereto the cord leads, or a suspension such as a swinging suspension, a suspension hook, a suspension eyelet or the like, from which the cord continues further on to a supply terminal such as a lamp outlet, e.g. at a different point on the ceiling surface. Apart from this prior art, conical fitting, which is dislosed in Swedish patent no. 200 070, various other lamp suspension devices are known, which among others are described in Swedish patent no. 388 025 and in German published applications nos. 2 159 985 and 2 932 334.

A common feature of these prior art fittings is that the fitting should be fitted on the cord which is fixated to a ceiling surface, e.g. a cord at the end of which a swinging lamp is suspended from the ceiling surface, before the cord is connected to an electrical outlet or in any other way is connected at both ends to a supply terminal, such as a lamp outlet, and at the other end to an electrical appliance or device, such as a swinging lamp, respectively, and that fixation of the fitting is not possible after suspension and connection of e.g. the swinging lamp or replacement without disassembling e.g. the swinging lamp. In numerous cases it is further extraordinarily difficult to establish an aesthetically acceptable and architecturally satisfying mounting with the fitting constructions of the prior art, as these fittings tend to move with respect to the desired and intended placement due to the material used and due to the unsecure fixation of the fitting with respect to the wire.

Moreover, from U.K. patent no. 202,056 is known an ornamental cover member made of metal and comprising two unidentical halves adapted for interengagement and for covering a ceiling rose by being secured in position by means of a collar with respect to the ceiling rose. Accordingly, this prior art construction requires the presence of a ceiling rose or fitting which in itself has the same disadvantages as those described above with respect to other fittings of the prior art, in particular that it cannot be fitted after suspension and connection to a lamp. The ornamental cover member known from this U.K. patent is provided with a cord passage cavity from which the cord is intended to suspend freely.

SUMMARY OF THE INVENTION

One object of the present invention is to provide a fitting which eliminates the limitations of the prior art as discussed above, which permits a fitting or fixation of the fitting after suspension and connection of an electrical appliance, such as a swinging lamp, which permits a simple dismantling for the purpose of cleaning and/or replacement, and which makes it possible to obtain a reliable and longterm stable fixation with respect to the cord.

This object is achieved by a fitting according to the present invention for covering the fixation point of an electrical cord to a ceiling surface, comprising a hollow body, which defines an outer curved plane and an inner cord passage cavity, said fitting being characterized in that the body comprises two parts which are movable with respect to one another between a first position, in which the body is opened so that the cord can be introduced freely into said inner cord passage cavity, and a second position, in which the body is closed and fits around the cord so that the cord is received in the inner cord passage cavity. According to the characteristic elaboration of the fitting of the present invention, the hollow body of the fitting comprises two parts, which in said first position provide an opened hollow body, into which the cord may be introduced freely, and which in said second position provide a fitting encircling the cord and forming a cover of virtually the same type as the fittings of the prior art. The described mobility between the two parts of the fitting body may be established as a rotational or displacement movement or a combination thereof, which will be evident from the detailed description given below.

According to the presently preferred embodiment of the fitting of the present invention, the fitting preferably comprises further means for securing the two parts of the fitting body in said second position. These locking means may be constituted by any suitable locking means, such as adhesive tape, snap fitting means, snap locking means, etc. By the provision of locking means, it is ensured that the two parts of the fitting, when moved from said first position to said second position, remain in that second position and do not seek to return to said first position, thereby causing a partial opening or closing of the fitting body due to elasticity present in the fitting body or in the core immediately after the second position has been reached, or after a shorter or a longer period of time. In the presently most preferred embodiment of the invention, the locking means are, however, constituted by a longitudinal tongue in the first part of the fitting body and a corresponding longitudinal groove in the second part of the fitting body, and in this embodiment the tongue may be provided with a longitudinal bead so that the two parts of the fitting body are interlocked when the tongue is introduced into the groove. In a variation of this preferred embodiment, the tongue has no locking bead, and snap fitting means may be provided instead for securing the two parts of the fitting when these are moved from said first position to said second position.

In order to ensure that the fitting is maintained in the intended position with respect to the cord, which is received into the hollow body of the fitting and extends through the inner cord passage cavity, and consequently with respect to said ceiling surface, the fitting body is provided with supporting means, which in the closed position fit tightly around the cord. These supporting means may be constituted by transverse ribs provided in the cord passage body; however, according to the invention, said two parts are preferably adapted to fit tightly around the cord in said second position. As compared to the fittings of the prior art, which, as discussed above, are intended for retention with respect to the cord onto which the fitting has been mounted by friction against the cord, it is, according to the present invention, possible to provide a substantially higher friction between the cord and the fitting body than it is possible with the fittings of the prior art, which should be designed so that the fitting by mounting and dismounting allows introduction of the cord into an aperture in the fitting. The fit between the two parts of the fitting and the cord of the fitting according to the present invention may, unlike the corresponding fit established between a fitting of the prior art and a cord onto which this type of fitting is mounted, be adapted so that it becomes physically impossible to pull the cord through the fitting after said two parts are passed to the second position, or equivalent thereto makes it impossible to displace the fitting with respect to the cord. A particularly good retention of the fitting with respect to the cord can be achieved by providing a number of projections in connection with the cord passage aperture, which, when said two parts are passed to the second position, provide a surface of contact with the cord at an angle so that the assembled fitting may easily be pushed in direction of a ceiling surface, but only with difficulty can be pushed in the opposite direction.

The fitting according to the present invention may be provided with any geometrical shape and may e.g. be adapted to the shape of a specific swinging lamp or any other electrical applicance in connection with which the fitting is to be used. Accordingly, the fitting according to the present invention may have e.g. an elliptical cross section, a square or rectangular cross section or, like conventional fittings, a circular cross section when the two parts of the fitting body are placed in said second position. In accordance with the presently preferred embodiment of the fitting according to the present invention, the body in said second position forms a substantially rotationally symmetrical body which defines an upper circumferential edge for placement adjacent to the ceiling surface and, opposite the circumferential edge, a cord passage aperture adjacent to said inner cord passage cavity. The upper circumferential edge further preferably defines a plane which in the preferred embodiment of the fitting extends perpendicular to the symmetrical axis of the rotationally symmetrical body. Alternatively, the upper circumferential edge may form an angle with the symmetrical axis of the rotationally symmetrical body so that the fitting may be used directly in contact with ceiling surfaces which are non-horizontal.

In accordance with three alternative embodiments of the fitting according to the present invention, 1) the above-mentioned two parts of the fitting body are constituted by two identical hemispheres which together forms the body, 2) the above-mentioned two parts of the fitting body are interconnected by a continuous wall section of the outer, curved plane of the body, and 3) the above-mentioned two parts of the fitting body are interconnected by hinge means.

In the embodiment referred to above, in which the two parts are interconnected by a continuous wall section of the outer, curved plane of the body, the outer, curved plane of the body is adapted to allow the continuous wall section to deform so that the fitting body can be made to enter the above-mentioned two positions: the first position, in which the body is open, and the second position, in which the body is closed and fitted around the cord, respectively.

In the embodiment referred to above, in which the two parts of the fitting body are interconnected by hinge means, these hinge means extend preferably continuously from the upper circumferential edge of the body to a position adjacent to the cord passage aperture. By designing the hinge means as through or continuous hinge means, it is also in this embodiment achieved that the outer, curved plane of the body, when the body is in said second position, appears essentially continuous. The hinge means are preferably formed as film hinges, i.e. as a, with respect to the surrounding material, thin section of material cast in one piece which makes it possible to open and close the two parts of the fitting body a great number of times without the risk of breakage.

In accordance with alternative, advantageous embodiments, the fitting body, which as explained above preferably forms a substantially rotationally symmetrical body in said second position, preferably has the shape of a truncated cone, a hemisphere or a cylinder, and the body is preferably formed as a thin-walled body made of metal or plastics. By the making of the fitting body from plastics, linear weakening lines may be provided, which allows a shortening of the fitting body so that the total height of the fitting can be adapted to a specific application, i.e. matched with the specific architectural environment, including the ceiling height, the cord length and the size of the suspended electrical appliance, e.g. the suspended swinging lamp. The above-mentioned linear weakening line may alternatively be provided for forming a tapping, through which a cord can be passed from the fitting, across a ceiling surface, to a lamp outlet or an electrical supply terminal. The linear weakening line may furthermore, alternatively, be provided in order to make it possible to form the fitting, which as explained above preferably is provided with a rotationally symmetrical body for use in connection with substantially horizontal ceiling surfaces, with a an upper, bevelled edge for adapting it to a specific angle of inclination of the ceiling.

As mentioned above, the fitting body is preferably formed as a thin-walled body made of metal or plastics. Preferred metals are copper and aluminium as well as alloys of these metals. Preferred plastic materials are polyethylene, or when the body should be provided with an integral film hinge, polypropylene or polyoxymethylene (POM), or if a particularly blank and beautiful surface is desired, acrylics.

To ensure that the outer, curved surface of the body appears as a continuous, outer, curved plane when the body is in said second position, the body may advantageously be matted or provided with a coloring serving the purpose of presenting the body in the second position with an outer, curved plane appearing as a continuous, curved surface. The fitting body may furthermore be adapted for the mounting of additional decorative elements, which in addition to serving purely ornamental or decorative purposes may also perform the function of locking or securing the fitting body in said second position and thus constitute said locking means. The decorative elements may furthermore advantageously be replaceable so that the fitting can be adapted to specific architectural environments or desires.

The present invention will be described in further details below with reference to the drawings.

BRIEF DESCRIPTION OF THE DRAWINGS

FIG. 5 shows a fifth embodiment of a fitting according to the present invention provided with a spring lock comprising groove and tongue, and two film hinges;

FIG. 6 shows a sixth embodiment of a fitting according to the present invention provided with groove and tongue as control means, and push-button locks;

FIG. 7 is a cross-sectional view through the spring lock comprising of groove and tongue of the embodiment shown in FIG. 5;

FIG. 8 shows a seventh embodiment of a fitting according to the present invention provided with friction projections, and FIG. 9 shows the embodiment of FIG. 8 of a fitting in its closed position in which it is fitted around a cord.

DESCRIPTION OF THE PREFERRED EMBODIMENT(S)

Figure 1:
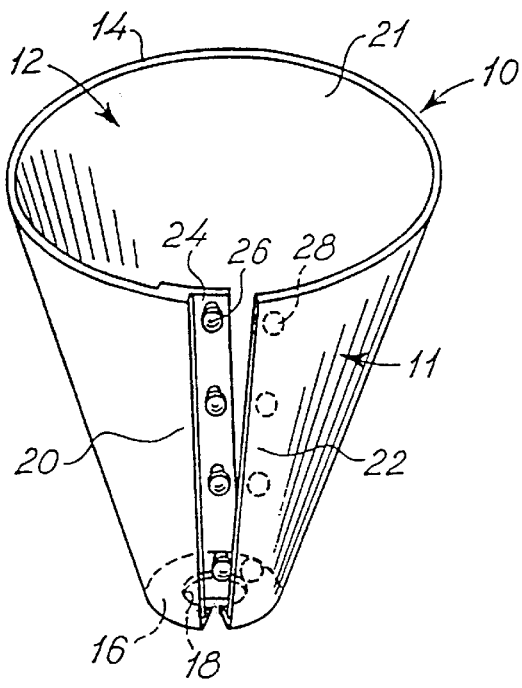
FIG. 1 shows a first embodiment of a fitting according to the present invention provided with push-button locks.

FIG. 1 schematically shows a first embodiment of a fitting according to the present invention, which in its entirety is designated by reference numeral 10. The fitting is illustrated in a partially opened position. The fitting 10 comprises a rotationally symmetrical and substantially conical body which in its entirety is designated by reference numeral 11 and which defines an inner cord passage cavity 12, an upper circumferential circular edge or flange 14 and an opposite annular surface 16 provided with a circular cord passage aperture 18. The body 11 of the fitting comprises two adjoining parts or surface elements 20 and 22 which are interconnected by a continuous, curved surface part 21 of the body 11. The Parts 20, 21 and 22 together forms a thin-walled, continuous fitting body 11 which can be assembled to a closed conical fitting with an appearance substantially corresponding to the fitting construction which is known from Swedish patent no. 200 070. In this closed position, the two parts 20 and 22 of the fitting body are maintained adjacent to one another by means of snap fittings 26 provided on the inner path of material 24 of the part 20, which path is adapted to abut on the inner surface of the part 22 when the snap fittings 26 are received in corresponding recesses of the inner wall of the part 22. As it will be obvious for a person skilled in the art, the first embodiment shown in FIG. 1 can be modified by replacing the snap fittings 26 by other locking means, such as spring locking means e.g. in the form of dovetailed wedges or the like.

Figure 2:
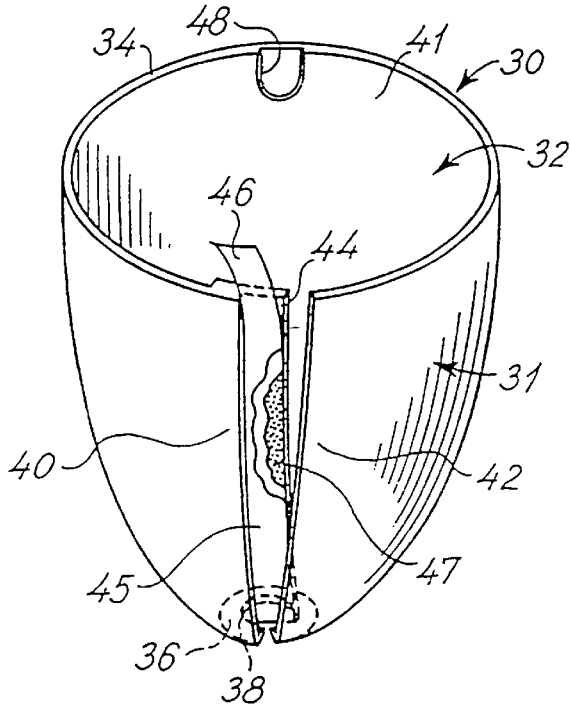
FIG. 2 shows a second embodiment of a fitting according to the present invention provided with an adhesive tape or a tape closure.

FIG. 2 shows a second embodiment of the fitting according to the present invention, which in its entirety is designated by reference numeral 30. The second embodiment shown in FIG. 2 of the fitting according to the present invention is distinguished from the above-described first embodiment with reference to FIG. 1 in that the body 31 of the fitting does not provide a truncated cone, but forms a body which curves in two directions and having essentially the shape of an ellipsoid part. The body 31 of the fitting defines an inner cord passage cavity 32 and moreover an upper, circumferential flange or edge 34 which, when the body 31 of the fitting is in its closed or assembled position, provides a circle, and opposite the upper, circumferential edge 34 an annular surface 36 in which a cord passage aperture 38 is provided. Corresponding to the above-described first embodiment 10 with reference to FIG. 1, the body 31 of the fitting comprises two adjoining parts 40 and 42 which crosses each other continuously through a wall section 41 which allows opening and closing of the fitting. At the upper edge 34 of the body 39 a linear weakening line 48 has been provided opposite the aperture of the body which is provided between the two parts 40 and 42, which linear weakening line serves the purpose of allowing for the provision of tappings through which a cord which is passed through the cord passage aperture 38 extends through the inner cord passage cavity 32, can be passed through the tapping of a lamp outlet or a similar electrical connection. In replacement of the snap fittings 26 described above with reference to FIG. 1, a double adhesive tape 46 is provided in the embodiment shown in FIG. 2, one surface of which adhesive tape is adhered to an outwardly facing surface of a path 44 corresponding to the path 24 as described above, and the opposite side or surface of which before se is covered with a release paper 45. Part of said release paper has been omitted, and the outer adhesive layer 47 of the adhesive tape 46 is shown, which adhesive layer 47, when all release paper 45 is removed, is adapted to adhere to the inner surface of the part 42.

The first and second embodiments of the fitting according to the present invention are used in essentially the same manner, in that the fitting is mounted after suspension of an electrical appliance, such as a swinging lamp; whereby the fitting 10 and 30, after the opening which is provided in the fitting body between the parts 20, 22 and 40, 42, respectively, possibly is increased by a deformation of the wall part 21 and 41, respectively, of the fitting, is fitted around the cord so that the cord extends through the inner cord passage cavity 12 and 32, respectively, of the fitting and the cord passage bushing aperture 18 and 38, respectively. After mounting of the fitting at the desired point with respect to the cord and with respect to a ceiling surface, from which e.g. the swinging lamp is suspended, the fitting is then assembled in that the two parts 20, 22 and 40, 42, respectively, are assembled, whereafter the fitting is secured in this closed position by the interaction of the snap fittings 26 with the recesses 28 and the double-adhering adhesive tape 46, respectively.

Figure 3:
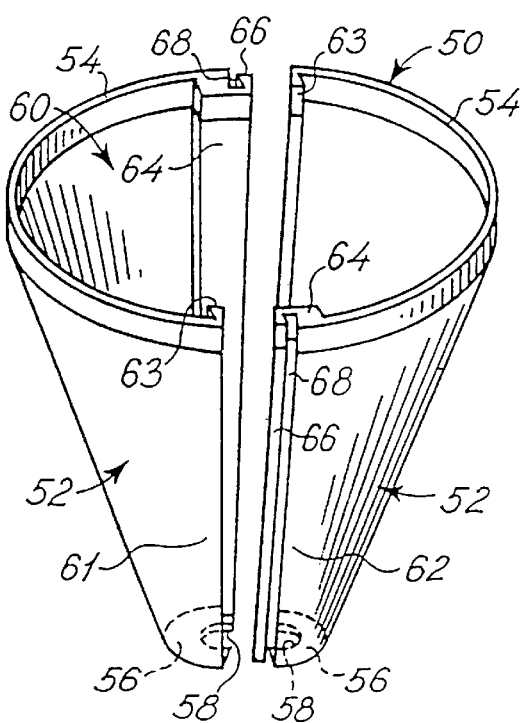
FIG. 3 shows a third embodiment of a fitting according to the present invention comprising two identical halves.

FIG. 3 shows a third embodiment of the fitting according to the present invention, which in its entirety is designated by reference numeral 50. As compared with the embodiments discussed above which comprise one single body, the third embodiment 50 shown in FIG. 3 comprises two identical halves 52 adapted for assembly in order to obtain a continuous fitting body. Each of the two halves 52 constitutes one half of a truncated cone and defines an upper, semicircular flange or edge 54 and opposite this semicircular edge a surface part 56 constituting one half of an annular plane, in which a circular passage aperture is provided, when the two halves 52 are assembled, which aperture is provided by semicircular notches 58 in the surfaces 56. When the two halves 52 are assembled, the fitting 50 provides an inner cord passage cavity 60 through which a cord can extend from e.g. a lamp outlet which is covered by the fitting 50, through the cord passage aperture formed by the semicircular notches 58. The two halves 52 are assembled along symmetrically spaced cuttings in the truncated cone provided by the halves when assembled. Abutting on this linear cut one of the two halves has a surface part 61, whereas the other half has a surface part 62, which parts are adapted for assembly by means of spring locking means. Due to the symmetry of the construction, each of the two halves 52 has a surface part 61 and a surface part 62, respectively. For the provision of a snap locking with the surface part 62, the surface part 61 has an inwardly extending dovetailed wedge 63 adapted to be received in a notch 68 provided by a wall flange 66 which extends outwardly from a wall reinforcement 64 which per se corresponds to the paths 24 and 44 described above. The third embodiment shown in FIG. 3 is further distinguished from the embodiments 10 and 30 described above and also from a fourth embodiment, which will be described below with reference to FIG. 4, in that the two halves 52 preferably are made of a comparatively rigid plastics material, e.g. polypropylene, whereas the other embodiments shown in the drawings preferably are made of a soft plastics such as soft polypropylene, polyethylene or PVC.

Figure 4:
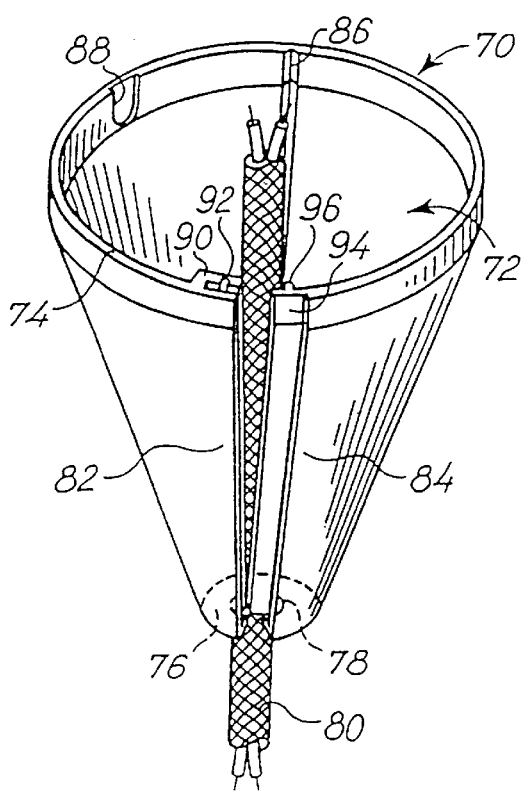
FIG. 4 shows a fourth embodiment of a fitting according to the present invention provided with a film hinge and a spring lock, and further showing an electrical cord.

FIG. 4 shows a fourth embodiment of the fitting according to the present invention, which in its entirety is designated by reference numeral 70. This fourth embodiment comprises a body 71 which, when assembled, provides a truncated, conical fitting. When assembled, the body 71 further provides an inner cord passage cavity 72 and defines an outer circumferential flange or edge 74 and opposite this circumferential edge an annular surface 76, in which a circular cord passage aperture 78 is provided, through which an electrical cord 80 is led. When the fitting is assembled it preferably fits tightly around the cord 80 in the cord passage aperture 78, so that the fitting and the cord cannot be displaced with respect to each other, so that the fitting at a later time is not displaced or moved with respect to the cord and thus removed from an intended position in which it is fixated. Like the embodiments described above with reference to FIGS. 1 and 2, the body 71 has two surface parts 82 and 84 abutting on each other along a dividing line, but unlike the embodiments described above with reference to FIGS. 1 and 2, these parts constitute two halves of the body 71 which halves are interconnected through a continuous hinge 86 formed as a film hinge. Like the embodiment shown in FIG. 2, a linear weakening line 88 is also provided in the part 82, which linear weakening line makes it possible at this place to establish a tapping through which the cord 80 can be led to a lamp outlet or any other electrical supply terminal. For locking of the two parts 82 and 84 in the closed position, fitting tightly around the cord 80 and providing a continuous, uninterrupted outer surface, the part 82 has an inwardly extending flange 90 in which a groove 92 is provided. For interaction with the flange 90 and the groove 92, the part 84 has an elongation 84 in the form of a flange which is provided with an inwardly extending bead 96. The flange 94 is adapted to engage behind the flange 90 as the bead 96 thus locks in the groove 92.

FIG. 5 shows a fifth embodiment of the fitting according to the present invention, which in its entirety is designated by reference numeral 100. This fifth embodiment comprises a body 101 which when assembled provides a truncated, conical fitting. When assembled, the body 101 further provides an inner cord passage cavity 102 and defines an outer circumferential flange or edge 104 and opposite this circumferential edge an annular surface 106 (not shown), in which a circular cord passage aperture 108 is provided. Like the embodiment described above with reference to FIG. 4, the body 101 has two flat parts 110 and 112 which abut on each other along a dividing line, but which unlike the embodiment shown in FIG. 4 are interconnected through two hinges 113 and 114 formed as film hinges, which hinges are arranged at small intervals and extend parallel. For locking the two parts 110 and 112 in the closed position, fitting tightly around a cord and providing a continuous, uninterrupted outer surface, the part 112 has a longitudinal flange 115 which on the surface facing the cord passage cavity 102 has a longitudinal bead 118, which can also be seen from FIG. 7. For interaction with the longitudinal flange 115 and the longitudinal bend 118, the part 110 has a longitudinal groove 117 which is open so as to provide a strap which secures a sharp rear edge of the bead 118 when the longitudinal flange 115 is passed through the longitudinal groove 117 to a position in which the body is assembled. By making the fitting of an elastic, resilient plastics material such as polypropylene, the body can be reopened by pulling the two parts away from each other and e.g. with the fingers manipulate the longitudinal bead 118 so that it falls out of engagement with the rear edge of the longitudinal groove 117.

FIG. 6 shows a sixth embodiment of the fitting according to the present invention, which in its entirety is designated by reference numeral 100'. This embodiment differs from the embodiment of FIGS. 5 and 7 solely in that the locking means are designed in a different way; accordingly, this figure only contains reference numerals to these locking means. By reference numeral 130 a recess is shown which is adapted to interact with a snap fitting 131 at one end of the fitting, whereas there is provided a corresponding recess 132 and snap fitting 133 at the opposite end of the fitting body. Between the locking means a longitudinal tongue or pin 134 is provided which is intended to engage with a longitudinal groove or recess 136 in the second part of the fitting body. Recesses, snap fittings, pin and recess are placed geometrically so that, when the body is assembled, a continuous, smooth surface is provided along the dividing line where the two side parts of the body meet in the assembled position.

FIG. 8 shows a particular embodiment of the part of the fitting according to the present invention which is intended to fixate the cord. This embodiment is in FIG. 8 shown as a variation of the embodiment shown in FIG. 5 with corresponding reference numerals, but it can be applied to all embodiments shown in FIGS. 1–6. In this particular embodiment, four synmmetrically placed projections 120, 121, 122 and 123 are provided in the annular lower surface 106 which encircles the circular cord passage aperture 108. These projections, which preferably are cast in one piece with the body, forms a suitable angle, e.g. of 45° with respect to the cord passage direction, away from the body, so that the fitting when assembled as shown in FIG. 9 can easily be pushed in a direction towards a ceiling and subsequently will remain in its position because the friction of the projections against the cord can fixate the fitting in position around the cord 124 shown in FIG. 9.

Even though the invention is described above with reference to a large number of presently preferred embodiments of the fitting, it is obvious for persons skilled in the art that numerous changes and modifications can be made within the scope of the invention, such as those described in the accompanying patent claims, without differing from the spirit and aim of the invention. The embodiments described above may furthermore be combined in any way, and elements or features of one embodiment may readily be incorporated into another embodiment.

LIST OF REFERENCE NUMERALS

10 First embodiment of fitting
11 body

12 Inner cord passage cavity
14 circumferential edge
16 annular surface
18 cord passage aperture
20 part of body
21 part of body
22 part of body
24 path
26 snap fitting
28 recess
30 second embodiment of filling
31 body
32 inner cord passage cavity
34 circumferential edge
36 annular surface
38 cord passage aperture
40 part of body
41 part of body
42 part of body
44 flange
45 release paper
46 double-adhering adhesive tape
47 exposed adhesive layer
48 linear weakening line for tappings
50 third embodiment of fitting
52 half
54 semicircular edge
56 part of annular surface
58 semicircular notch
60 inner cord passage cavity
61 surface part
62 surface part
63 dovetailed wedge
64 path
66 flange
68 notch
70 fourth embodiment of fitting
71 body
72 inner cord passage cavity
74 circumferential edge
76 annular surface
76 cord passage aperture
78 cord
80 part of body
82 part of body
84 film hinge
86 linear weakening line for tappings
88 flange
90 groove
92 flange
94 bead
96 fifth embodiment of fitting
100 body
102 inner cord passage cavity
104 outer, circumferential ridge or edge
106 annular surface
108 circular cord passage aperture
110 flat component
112 flat component
113 hinge
114 hinge
115 flange
117 groove
118 bead
120 projection
121 projection
122 projection
123 projection
124 wire
101' sixth embodiment of fitting
130 recess
131 snap-fitting
132 recess
133 snap fitting
134 tongue or pin
136 groove or recess

I claim:

1. A ceiling fitting or cover for covering a connection of a single electrical cord adjacent to a ceiling surface without being connected to the ceiling surface or to any electrical box at the ceiling surface and comprising a hollow body, which defines an outer curved plane and an inner cord passage cavity and which has an upper circumferential edge having a peripheral length and a lower wall having an inner circumferential edge having a smaller peripheral length than said upper edge, said hollow body comprising two parts, which are movable with respect to one another between a first position, body is open so that a cord can be introduced freely into said inner cord passage cavity, and a second position, in which said hollow body is closed and fits around the cord so that the cord is received in the inner cord passage cavity, said hollow body also including supporting means, which, in said second positions, are constructed and arranged to support said hollow body by being fitted tightly around the cord, and said two parts being interconnected by hinge means which extend continuously from said upper circumferential edge to said lower wall which is adjacent to and defines a cord passage aperture and which comprises at least one film hinge.

2. The fitting of claim 1 further comprising means for securing said two parts in said second position.

3. The fitting of claim 1 wherein said supporting means comprises said inner edge of said lower wall and defines said cord passage aperture between said two parts.

4. The fitting of claim 1, wherein the hollow body in said second position forms a substantially rotationally symmetrical body which defines said upper circumferential edge for placement adjacent to a ceiling surface and, opposite the circumferential edge, said cord passage aperture is located adjacent to said inner cord passage cavity and defines said lower circumferential edge.

5. The fitting of claim 2, wherein said securing means for securing said two parts in said second position are constituted by longitudinal flange means on the first part and a corresponding longitudinal groove on the second part as well as a longitudinal bead on the longitudinal flange means for providing a non-sliding, snap fitting with the longitudinal groove.

6. The fitting of claim 1, wherein said inner edge of said lower wall defines said supporting means and said supporting means are further defined by a number of preferably elastic, resilient projections extending inwardly from said inner edge and which, when in the second, closed position of the body fit tightly around the cord in such a way that the fitting when pushed around the cord is secured by means of She friction of the projections with the cord.

7. A ceiling fitting or cover for covering a connection of a single electrical cord to a ceiling surface without being connected to the ceiling surface or to any electrical box at the ceiling surface, said fitting comprising:
   a hollow body which has an upper circumferential edge having a peripheral length,
   a lower wall with an inner edge having a smaller peripheral length than said upper circumferential edge, and a hollow interior, said hollow body further including a first section and a second section which are movable with respect to each other between a first position where said hollow body is open so that an electrical cord can be inserted easily into said hollow interior of the hollow body and a second position in which said hollow body is closed around the cord and latched in said closed position, said first and second sections in said first position being open along at least one pair of first and second opposed longitudinal free edges of said first and second sections, said first longitudinal free edge having integrally formed therein a first latching structure and said second longitudinal free edge having a second mating latching structure integrally formed therein, respectively, said first section also having a third edge opposite said first free edge, said third edge having a third latching structure integrally formed therein and said second section also having a fourth edge opposite said second free edge, said fourth edge having a fourth mating latching structure integrally formed therein, said first and second sections being constructed and arranged, so that when said first and second sections are brought together in a non-sliding, face-to-face manner, said first and second latching structures can latch said first and second sections together around the electrical cord along the first and second free edges and said third and fourth latching structures can latch said first and second sections together around the electrical cord along the third and fourth edges without sliding movement between said first and second sections and without any separate latching parts.

8. The fitting of claim 7 wherein said first and second sections comprise two identical halves which together form said hollow body.

9. The fitting of claim 7 wherein said first latching structure on said first section comprises a longitudinally extending flange having a longitudinal bead extending at an outer end thereof to form a hook-in-cross section structure, and said second latching structure on said second longitudinal free edge comprises an elongate body having a longitudinally extending groove therein adapted to snap-fittingly receive said hook-in cross section structure in a face-to-face manner without sliding between said first and second sections.

10. The fitting of claim 7 further comprising supporting means which, in said second position, supports said hollow body by being tightly fitted around the cord.

11. The fitting of claim 10 wherein said supporting means comprise a cord passage including a cord passage aperture and wherein, in said second position, said hollow body forms a substantially symmetrical body including an upper circumferential edge for placement adjacent a ceiling surface and a lower wall having an inner edge defining said supporting means.

12. The fitting of claim 11 wherein said supporting means include two or more elastic resilient projections extending inwardly from said inner edge of said lower wall which, when said first and second sections are in said second position, fig tightly around the cord in such a way that said fitting is secured in said second position by the friction of said projections engaging the cord.

13. The fitting of claim 7 wherein said hollow body has a generally conical shape.

14. A ceiling fitting or cover for covering a connection of a single electrical cord to a ceiling surface without being connected to the ceiling surface or to any electrical box at the ceiling surface, said fitting comprising:

a hollow body having an upper circumferential edge with a peripheral length, a lower wall with an inner edge having a smaller peripheral length than said upper circumferential edge and a hollow interior and including a first section having a first longitudinal free edge and a second section having a second longitudinal free edge, both being movable with respect to each other between a first position of said hollow body where said hollow body is open and first and second longitudinal free edges of said first and second sections are spaced from each other so that an electrical cord can be inserted easily into said hollow interior of the hollow body and a second position in which said hollow body is closed around the cord, said first and second sections being hinge connected together by a continuous living hinge along a longitudinal line opposite each of said first and second free edges, such that said first and second sections must be rotated toward each other when moving said first and second sections to said second position.

15. The fitting of claim 14 wherein each said first and second longitudinal free edge of said first and second sections has integrally formed thereon first and second mating latching means whereby said first latching means will latch with said second mating latching means when said first and second sections are brought into face-to-face, non-sliding engagement with each other.

16. The fitting of claim 15 wherein said first latching means on said first section comprises a longitudinally extending flange having a longitudinal bead extending at an outer end thereof to form a hook-in-cross section structure, and said second latching means on said second sect-on comprises an elongate body having a longitudinally extending groove therein adapted to snap-fittingly receive said hook-in cross section structure in a face-to-face manner without sliding movement between said first and second sections.

17. The fitting of claim 14 further comprising supporting means which, in said second position, supports said hollow body by being tightly fitted around the cord.

18. The fitting of claim 17 wherein said supporting means comprise a cord passage including a cord passage aperture and wherein, in said second position, said hollow body forms a substantially symmetrical body including an upper circumferential edge for placement adjacent a ceiling surface and a lower wall having an inner edge defining said supporting means.

19. The fitting of claim 17 wherein said supporting means include two or more elastic resilient projections extending inwardly from an inner edge of said lower wall which, when said first and second sections are in said second position, fit tightly around the cord in such a way that said fitting is secured in said second position by the friction of said projections engaging the cord.

20. The fitting of claim 14 wherein said hollow body has a generally conical shape.

21. A ceiling fitting or cover for covering a connection of a single electrical cord to a ceiling surface without being connected to the ceiling surface or to any electrical box at the ceiling surface, said fitting comprising:

a hollow body which has an upper circumferential edge having a peripheral length, a lower wall with an inner edge having a smaller peripheral length than said upper circumferential edge, and an hollow interior, said hollow body further including a first section and a second section which are movable with respect to each other between a first position where said hollow body is open so that an electrical cord can be inserted easily into said hollow interior of the hollow body and a second position in which said hollow body is closed around the cord and latched in said closed position, said first and second sections in said first position being open along at least one pair of first and second opposed longitudinal free edges of said first and second sections, said first longitudinal free edge having integrally formed therein a first latching structure and said second longitudinal free edge having a second mating latching structure integrally formed therein, respectively, said first and second sections being hinge connected together along a third longitudinal edge opposite each of said first and second longitudinal free edges, such that said first and second sections are rotated toward each other when said first and second sections are moved to said second position.

\* \* \* \* \*

UNITED STATES PATENT AND TRADEMARK OFFICE
CERTIFICATE OF CORRECTION

PATENT NO.    : 6,034,328
DATED         : March 7, 2000
INVENTOR(S)   : Vibeke Kjerrumgaard It is certified that error appears in the above-identified patent and that said Letters Patent is hereby corrected as shown below:

Column 4,
Line 16, after "as", delete -- a, --;
Line 43, after "with" delete -- a --.

Column 6,
Line 23, "se" should be -- use --.

Column 8,
Line 9, "bend" should be -- bead --.

Column 9,
Line 11, "filling" should be -- fitting --;
Line 42, delete "76 cord passage aperture";
Line 43, delete "cord" insert -- passageaperture --;
Line 44, delete "80 part of body" and insert -- 80 cord --;
Line 47, "linear weakening line for tappings" should be -- 86 film hinge --;
Line 48, "88 flange" should be -- 88 linear weaking line for tappings --;
Line 49, "90 groove" should be -- 90 flange --;
Line 50, "92 flange" should be -- 92 groove --;
Line 51, "94 bead" should be -- 94 flange --;
Line 52, "96 fifth embodiment of fitting" should be -- 96 fifth bead --;
Line 53, "100 body" should be -- 100 fifth embodiment of fitting --;
Line 54, insert -- 101 body --;

Column 10,
Line 3, :101" should be -- 100' --;
Line 21, after "first position" insert -- in which said hollow --;
Line 59, "She" should be -- the --.

Column 11,
Line 59, "fig" should be -- fit --.

UNITED STATES PATENT AND TRADEMARK OFFICE
CERTIFICATE OF CORRECTION

PATENT NO.   : 6,034,328
DATED        : March 7, 2000
INVENTOR(S)  : Vibeke Kjerrumgaard It is certified that error appears in the above-identified patent and that said Letters Patent is hereby corrected as shown below:

Column 12,
Line 32, "sect-on" should be -- section --.

Signed and Sealed this

Tenth Day of September, 2002

Attest:

Attesting Officer

JAMES E. ROGAN
Director of the United States Patent and Trademark Office